United States Patent [19]

Dziedzic

[11] E Patent Number: Re. 32,076

[45] Reissued Date of Patent: Feb. 4, 1986

[54] MODULAR SCREW ANCHOR HAVING LEAD POINT NON-INTEGRAL WITH HELIX PLATE

[75] Inventor: Edward Dziedzic, Centralia, Mo.

[73] Assignee: A. B. Chance Company, Centralia, Mo.

[21] Appl. No.: 619,835

[22] Filed: Jun. 12, 1984

Related U.S. Patent Documents

Reissue of:

[64] Patent No.: 4,334,392
Issued: Jun. 15, 1982
Appl. No.: 136,881
Filed: Apr. 3, 1980

[51] Int. Cl.[4] ..... E02D 5/74

[52] U.S. Cl. ..... 405/303; 52/157; 175/400; 405/258; 405/259

[58] Field of Search ..... 405/258, 259, 260, 261, 405/262, 232, 268, 269, 244; 52/157, 156, 155, 158–162; 175/320, 322, 399, 400; 299/79

[56] References Cited

U.S. PATENT DOCUMENTS

| | | | |
|---|---|---|---|
| 505,811 | 10/1893 | Brown | 52/157 X |
| 665,711 | 1/1901 | Worsley | 175/400 X |
| 888,917 | 5/1908 | Lucas | 52/157 |
| 1,940,938 | 12/1933 | Chance | 52/157 |
| 1,954,166 | 4/1934 | Campbell | 175/399 X |
| 2,234,907 | 3/1941 | Williams | 52/157 |
| 2,686,660 | 8/1954 | Storm | 175/400 X |
| 3,148,510 | 9/1964 | Sullivan | 405/259 |
| 3,832,861 | 9/1974 | Jahnke et al. | 405/259 X |

OTHER PUBLICATIONS

A. B. Chance Co., Printed Publication.

*Primary Examiner*—Dennis L. Taylor
*Attorney, Agent, or Firm*—Schmidt, Johnson, Hovey & Williams

[57] ABSTRACT

A high strength, modular screw anchor is disclosed which exhibits enhanced failure resistance notwithstanding use of essentially the same amount of material as conventional anchors, and which can be installed using existing installation equipment. The preferred screw anchors of the invention include an elongated rod having one or more separate, specialized anchor members supported thereon, and an improved, obliquely oriented, beveled earth-penetrating lead to facilitate installation, particularly in rocky soils. The anchor member includes a tubular, central, rod-receiving hub presenting a polygonal in cross-section bore therethrough, and an outwardly extending helical blade affixed to and coaxial with the hub. In installation procedures the anchor rod is passed through the hub bore and the anchor member is operably coupled to the rod (as by resting it atop an outwardly extending shoulder provided on the rod); the tubular shank of a standard anchor wrench is next telescoped over the anchor rod and inserted into the hub bore such that a driving connection is established between the rod, shank and anchor member. Axial rotation of the wrench thus effects corresponding rotation of the screw anchor for installation purposes. The earth-penetrating lead of the screw anchor may be formed integrally with the major portion of the rod, or threaded thereon; in the latter case the overall length of the rod can be adjusted as desired. The modular nature of the screw anchors hereof permits stocking of only a relatively few standard components which can be used as needed in the field to achieve a desired anchor configuration.

18 Claims, 21 Drawing Figures

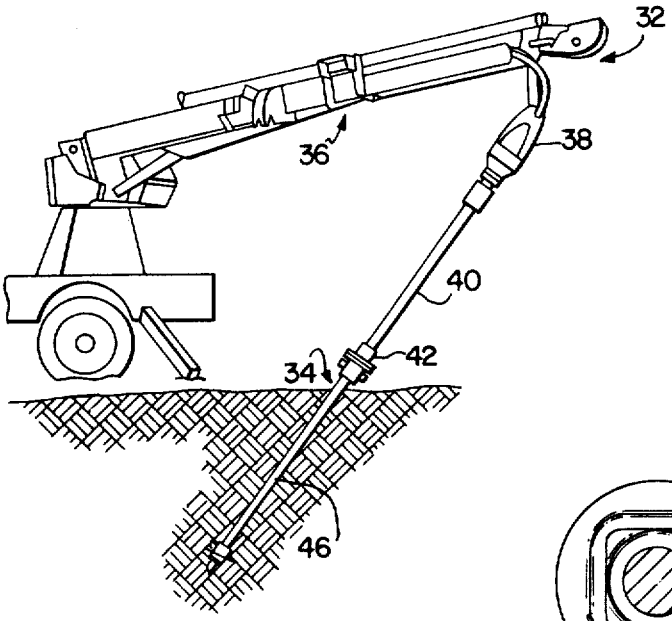
FIG. 1
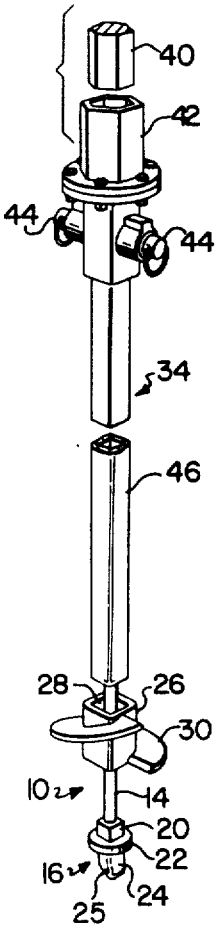
FIG. 2
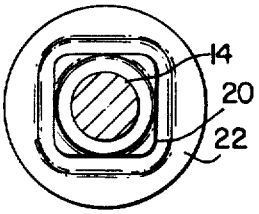
FIG. 5
FIG. 3
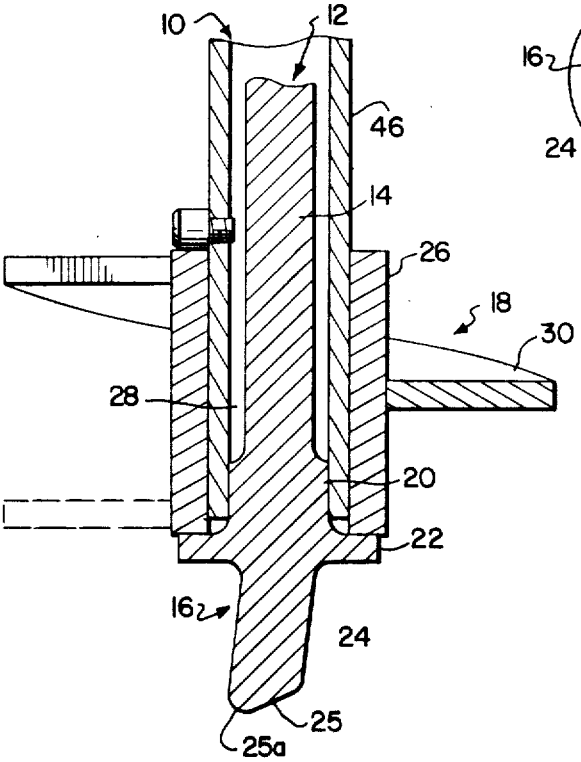
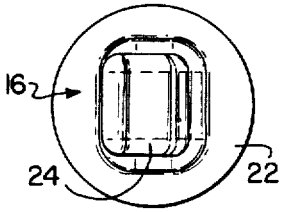
FIG. 6
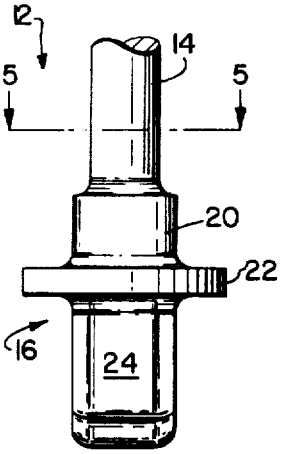
FIG. 4

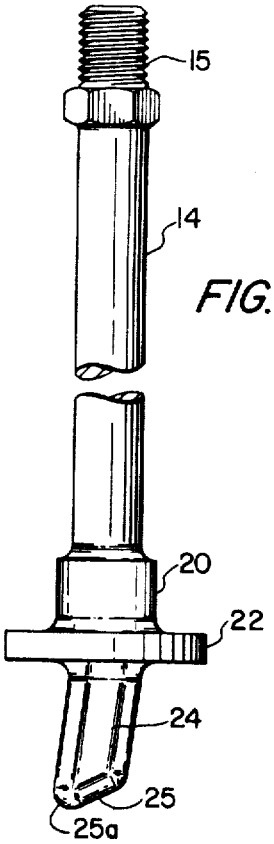
FIG. 7
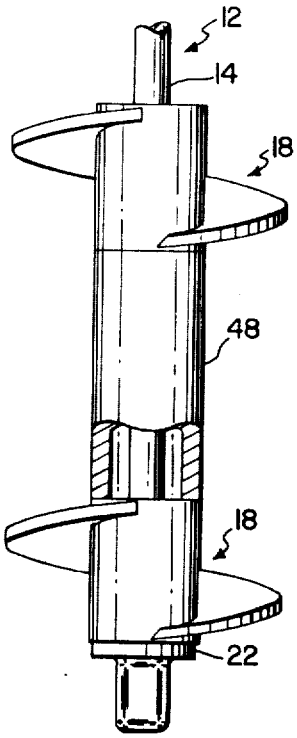
FIG. 8
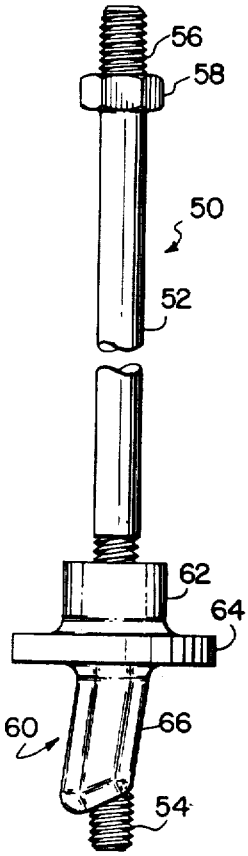
FIG. 9
FIG. 11
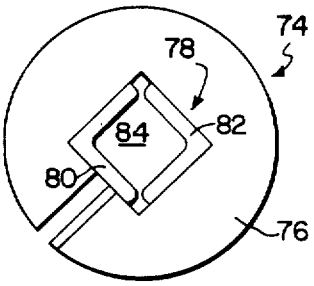
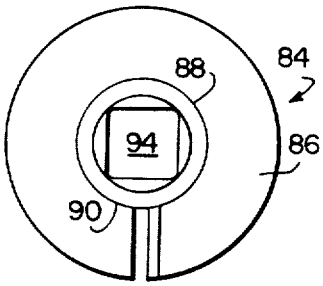
FIG. 13
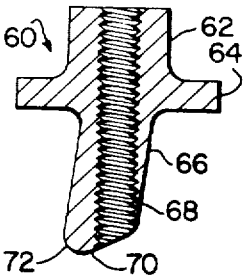
FIG. 10
FIG. 12
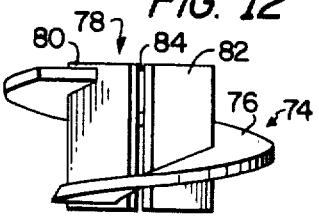
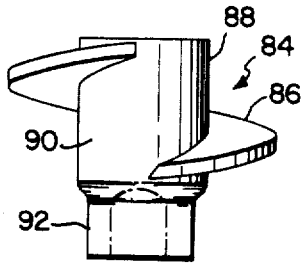
FIG. 14

FIG. 15
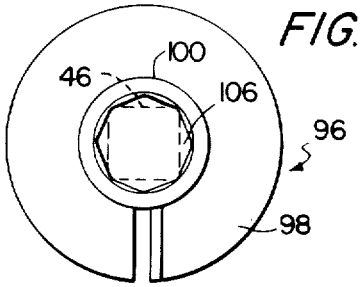
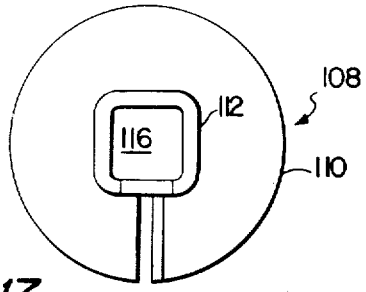
FIG. 17
FIG. 16
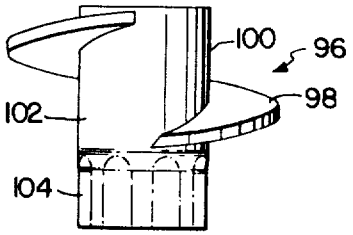
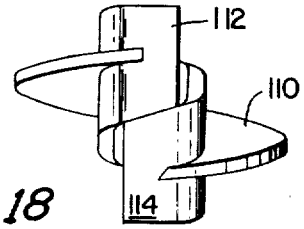
FIG. 18
FIG. 20
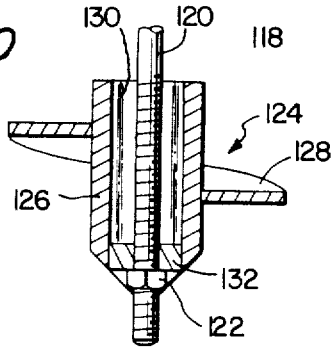
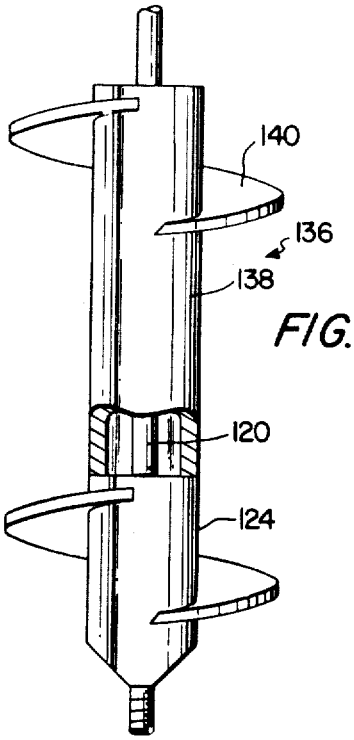
FIG. 21
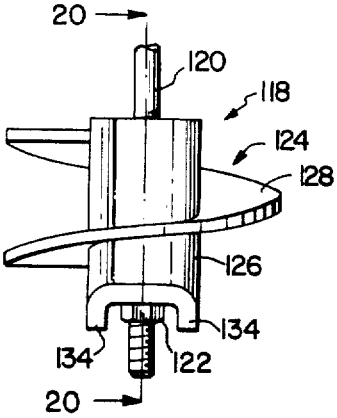
FIG. 19

MODULAR SCREW ANCHOR HAVING LEAD POINT NON-INTEGRAL WITH HELIX PLATE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is concerned with an improved, modular screw anchor (and a method of installing the same) which is characterized by extremely high resistance to breakage, particularly during installation when the anchor is subjected to high torsional loadings. More particularly, it is concerned with such modular screw anchors having separate rod and anchor members and which are designed to be installed using conventional, existing screw anchor wrenches and the like. A prime feature of the anchors in accordance with the invention is that greatly improved resistance to breakage is obtained despite the fact that the quantity of metal used in fabrication of the anchors is essentially the same as that of prior units having significantly lower resistance to breakage.

2. Description of the Prior Art

Present day earth screw anchors used by utilities and others for guying purposes generally comprise an elongated, solid, square in cross-section shaft having one or more helical, outwardly extending, load-bearing blades welded thereto, and an elongated, upwardly extending anchor rod threadably coupled to the anchor shaft. In installation procedures, an elongated anchor wrench including a tubular shank is telescoped over the anchor rod and drivingly engages the anchor shaft at the region of the helical blade or blades. Such engagement is established by virtue of a mating fit between the square cross-section of the shaft, and the corresponding square tubular configuration of the wrench shank. Installation of the anchor is accomplished by powered rotation of the wrench which in turn effects corresponding rotation of the anchor shaft and blade, so that the anchor is screwed into the earth. This is continued until the blade reaches sub-soil having a density sufficient for holding purposes.

Although conventional anchors and installation methods are well established, a number of problems remain. One of the most serious difficulties of relatively recent origin stems from the fact that the torque capacity of modernday installation equipment significantly exceeds the maximum torsional strengths of standard anchors. That is to say, newer installation equipment will commonly have a torque capacity in the range of ten thousand foot-pounds or more, whereas standard anchors have rated strengths in the range of four to seven thousand foot-pounds. As a result, utilities have experienced anchor breakage during installation, particularly in hard, dense, rocky soils. The principal breakage mode is that of anchor shaft breakage under torsional load when the helix strikes an obstruction. In other cases the helix may be stripped from the shaft, or the anchor wrench may split and simply rotate relative to the earth anchor.

One possible solution to these problems is to simply use thicker and stronger metal components in the anchor shaft and helix. However, this alternative is not a practical solution because of the cost involved and more importantly because it would necessitate the purchase of new anchor wrenches and related equipment. Obviously, utilities are loathe to simply scrap their expensive installation equipment if another solution is available. Accordingly, attempts have been made to strengthen conventionally sized earth anchors by improving material quality (e.g., by using special steel alloys having enhanced torque strength) and/or heat treating the central anchor shafts. However, these efforts have achieved only limited success, and are also relatively (twice or more) expensive.

Another fact of present anchors is the loss in strength which is inherent in the factory welding of the helix to the central shaft. This weld loss typically ranges from a few percent to as high as 10 to 15% and is directly subtractive from the strength of the central shaft. This can lead to field breakage during installation attempts by utilities and is a source of increased costs and constant concern on the part of the user. For the reliability required in utility electric distribution lines, the user must be confident that the anchor as installed will be undamaged after it has been subjected to installation torques. With present systems the user is forced to select the product torques just adequate for installation because of product costs and the wrench system in use, and this increases the risk of undetected damage to the anchor during installation.

Another limitation of present screw anchors is that when a strong anchor installation is desired in a particular soil, the maximum rod size, which must always be smaller in cross-section than the anchor shaft, limits the load holding capacity. This is true because the only practical way to attach the anchor rod to the anchor shaft is by drilling and tapping the shaft. The threaded connection zone thus becomes the holding power limit. Present maximums are about 36,000 lbs., obtained with a 1" rod.

Yet another problem associated with conventional anchors stems from the integral welded construction of the shaft-helix combination. Because of this, users are required to stock a wide variety of anchor sizes and types ( e.g., single or multiplex helix units) to meet the varying demands encountered in the field. As such, problems or ordering, warehousing and cost are multiplied.

SUMMARY OF THE INVENTION

The problems described above are in large measure solved by the present invention. Broadly, the earth anchors of the invention include an elongated rod along with an anchor member operatively coupled thereto in the form of a central, open-ended, rod-receiving hub having a bore therethrough and an outwardly extending load-bearing element (such as a helical blade) thereon. Means such as an upset shoulder on the rod is provided for supporting the anchor member. The hub bore is advantageously polygonal in cross-section and is sized for receiving a standard wrench shank therewithin such that the shank is drivingly connected to the central rod and anchor member. Disposition of the wrench within the hub decreases the possibility of wrench breakage, inasmuch as any such breakage would necessitate a severe external compression of the tubular shank.

Further, because of the fact that the anchor helix is secured to a hub spaced a significant distance from the central rod, the torque lever arm is much longer and weld length is substantially increased; this permits a smaller fillet weld to reduce the strength loss effect, and increases the shear resistance of the welded helix as compared with conventional units. This hub design thus overcomes for the most part the weld strength loss problem of the usual anchors.

The anchor members of the present invention are constructed using essentially the same quantity of metal (or less) as prior units of the same general class, even though tubular hubs are employed as opposed to solid shafts. The significance of this fact becomes plain when it is considered that mill prices for large quantities of steel either in solid bars or square structural tubes are essentially the same on a per pound basis; thus material costs are not increased with the anchors of the invention over standard solid shaft designs.

Use of tubular hubs for the anchor members hereof also greatly enhances the torsional strength of the unit, as opposed to solid bars. This stems from the demonstrable fact that the maximum shear resistance of a hollow tubular member is greater than that of a solid cylindrical shaft, where the net cross-sectional area of material is the same in both cases.

The modular nature of the anchors of the invention allows a user to custom design a given anchor in the field to meet various conditions. For example, if a multiple helix is required, a pair of anchor members can be placed on a central rod, using a tubular spacer between the respective hubs. Thus, only a relatively few standard components need be purchased and stored as compared with present practices.

In short, the anchors of the present invention give a number of significant advantages from the standpoint of strength and flexibility of use, without increases in material costs and while permitting use of standard installation equipment.

A wide number of specific anchor configurations are possible. For example, the anchor member hubs may be generally square in cross-section, or have a circular body with a swaged wrench shank-engaging portion. The hubs may further be unitary, formed of separate pieces (such as opposed metallic angles), or fabricated from plate.

An improved anchor lead is also provided to facilitate installation into dense or rock-like soils. The lead includes an elongated section oriented at an angle relative to the longitudinal axis of the remainder of the rod. The lower end of the section is preferably beveled and presents an earth-cutting lower edge. The offset section effectively cuts through the earth during installation to assist in proper anchor placement.

BRIEF DESCRIPTION OF THE DRAWINGS

FIG. 1 is a view illustrating the installation of a screw anchor in accordance with the invention, using a powered digger for this purpose;

FIG. 2 is a fragmentary, somewhat exploded view illustrating the components of a screw anchor in accordance with the invention, a conventional screw anchor wrench, and the end of a kelly bar used in installation procedures;

FIG. 3 is an enlarged, fragmentary vertical sectional view illustrating a modular screw anchor in accordance with the invention, with the tubular shank of a standard screw anchor wrench drivingly connected to the screw anchor;

FIG. 4 is a fragmentary view depicting the shouldered, earth-penetrating end of a screw anchor rod in accordance with the invention;

FIG. 5 is a sectional view taken along line 5—5 of FIG. 4;

FIG. 6 is a bottom view of the earth-penetrating end of the rod illustrated in FIGS. 4 and 5;

FIG. 7 is a fragmentary elevational view of an overall earth anchor rod;

FIG. 8 is an elevational view similar to that of FIG. 7 and depicting, with parts broken away for clarity, a shouldered earth anchor rod having a pair of anchor members disposed thereon and with a tubular spacer between the respective anchor members;

FIG. 9 is a view similar to that of FIG. 7 but illustrates another embodiment of the invention wherein an earth-penetrating lead section is threaded onto the end of a correspondingly threaded rod so as to cooperatively present a complete earth anchor rod;

FIG. 10 is a vertical sectional view of the threadably mounted, earth-penetrating lead illustrated in FIG. 9;

FIG. 11 is a plan view of the anchor member in accordance with the invention, wherein the central hub thereof is cooperatively defined by a pair of elongated, metallic angles;

FIG. 12 is an elevational view of the anchor member depicted in FIG. 11;

FIG. 13 is a plan view of another type of anchor member in accordance with the invention;

FIG. 14 is an elevational view of the structure illustrated in FIG. 13;

FIG. 15 is a plan view of another type of anchor member in accordance with the invention;

FIG. 16 is an elevational view of the anchor member of FIG. 15;

FIG. 17 is a plan view of yet another type of anchor member within the ambit of the invention;

FIG. 18 is a side elevational view of the anchor member of FIG. 17;

FIG. 19 is a fragmentary elevational view of another earth anchor of the invention, wherein depending portions of the anchor member hub cooperatively define the earth-penetrating lead for the anchor;

FIG. 20 is a vertical sectional view taken along line 20—20 of FIG. 19; and FIG. 21 is a view similar to that of FIG. 19, but illustrates the use of a second anchor member disposed atop the lowermost member and presenting a second load-bearing blade.

DESCRIPTION OF THE PREFERRED EMBODIMENTS

Turning now to the drawings, and particularly FIGS. 2–7, one type of screw anchor 10 in accordance with the invention is illustrated. Broadly speaking, the anchor 10 includes an elongated rod 12 made up of a major portion 14 and an earth-penetrating lead 16, and a modular one-piece anchor member 18 disposed on and operatively coupled to the rod 12.

In more detail, the rod 12 in the embodiment illustrated is an integral member having an elongated, rectilinear, major portion 14 of cylindrical cross-section (see FIG. 5), along with a wrench-engaging portion 20 of generally square cross-section at the lowermost end of the portion 14, and an upper threaded end 15 (see FIG. 7). An outwardly extending, circular shoulder 22 is provided adjacent the lower end of the portion 20 for purposes to be explained. On the other hand, lead 16 is in the form of an elongated, generally square section 24 which is obliquely oriented relative to the longitudinal axis of major portion 14. As can be seen, this section 24 extends and depends from the shoulder 22, is beveled as at 25 at its lower end, and presents a lowermost earth-cutting edge 25a.

Anchor member 18 includes an elongated, open-ended hub 26 of generally square cross-section and presenting a similarly configured bore 28 therethrough. An outwardly extending, load-bearing helical blade 30 is affixed (as by welding) to the exterior of the hub 26. As best seen in FIGS. 2 and 3, the hub 26 receives the rod 12, as well as the wrench-engaging portion 20. Moreover, the cross-sectional dimensions of the rod are substantially smaller than the dimensions of the surrounding hub bore 28, and the purpose of this will be explained hereinafter.

The installation of screw anchor 10 into the earth is illustrated in FIGS. 1–3. More specifically, the anchor 10 is designed for installation using standard. existing equipment such as digger 32 and anchor wrench 34. The powered digger 32 includes the usual boom 36 equipped with a hydraulic motor 38. A drive shaft in the form of a kelly bar 40 is coupled to the output of motor 38, and is received within an adaptor 42. The adaptor 42 is in turn coupled to the upper end of wrench 34. The installation wrench 34 is of the type described in U.S. Pat. No. 3,377,077 (the latter patent being incorporated by reference herein) and includes a pair of elongated, shiftable dogs 44 and a tubular, depending, square in cross-section shank 46.

In installation procedures, the anchor member 18 is first slipped over rod 12 and passed down the length thereof until the underside of hub 26 engages shoulder 22 (see FIG. 3). At this point the shank 46 of wrench 34 is telescoped over rod 12 and into the bore 28 of hub 26. Finally, the lowermost end of the shank 46 is lodged between the surfaces presented by wrench-engaging portion 20 of rod 12, and the surrounding surfaces defining the bore 28. This establishes a mating fit driving connection between the shank 46, rod 12 and anchor member 18. Means such as a simple set screw installed in the wrench tube wall above the upper margin of hub 26, prevents the anchor from sliding up the wrench during installation (see FIG. 3). Installation of the anchor is accomplished by axial rotation of shank 46 through the medium of motor 38 and associated drive described above, which effects corresponding axial rotation of rod 12 and anchor member 30. When the anchor has been installed to a desired depth (using extensions of anchor rod and wrench tube if necessary), the wrench is withdrawn by pulling the same upwardly and thereby leaving the anchor 10 installed in place. This installed anchor is then ready for installation of a guy or the like thereto.

The concepts of the present invention permit a wide variety of variations in specific anchor configurations. For example, (see FIG. 8 ) a pair of anchor members 18 can be installed upon a rod 12 and spaced a desired distance through use of simple tubular spacer 48. In practice, a first anchor member is slipped onto rod 12 as explained above, and passed down the length thereof until shoulder 22 is encountered. Tubular spacer 48 is next telescoped over the rod 12, followed by the second anchor member. Installation of this modified form of the invention proceeds exactly as described above.

FIGS. 9–10 illustrate an alternate anchor rod 50. In this instance the rod 50 includes an elongated, cylindrical major portion 52 having a threaded lower end 54, a threaded upper end 56, and a nut 58 applied to the latter. In this case however a bored earth-penetrating lead 60 is provided which includes an upper, generally square in cross-section wrench-engaging portion 62, an outwardly extending, circular shoulder 64, and a depending, elongated lead section 66. As best shown in FIG. 10, an elongated, threaded bore 68 extends vertically through the entirety of the lead 60; moreover, the longitudinal axis of section 66 is obliquely oriented relative to the longitudinal axis of major portion 52, and relative to the axis of bore 68. The lowermost end of the section 66 is beveled as at 70, and presents an earth cutting edge 72. Rod 50 is assembled simply by threading the lead 60 onto the lower end 54 of major portion 52. As depicted in FIG. 9, such threading can be such that the extreme lower end of the threaded section extends below the obliquely oriented lead section 66. In this way the overall effective length of the anchor rod 50 can be adjusted. Therefore, the problems heretofore encountered in providing precise lengths for anchor rods can be easily overcome.

Three additional embodiments are shown in FIGS. 11–18, inclusive. In each of these three embodiments an anchor member in accordance with the invention is illustrated, and in each case a single helical blade attached to a central hub is depicted. In the three embodiments however, various types of central hubs are illustrated. Installation of anchors using the anchor members of the three embodiments proceeds exactly as outlined above.

FIGS. 11–12 depict an anchor member 74 having a helical, load-bearing blade 76 and a central hub 78. In this instance the hub is formed from a pair of elongated, opposed, metallic channels 80, 82 which cooperatively present an elongated, open-ended central bore 84 therebetween of generally square cross-section. In this instance the welding of the blade 76 to the opposed channels 80, 82 serves to integrate the overall anchor member 74 as a one-piece unit.

FIGS. 13–14 illustrate an anchor member 84 having a blade 86 and a central hub 88. In this case the hub includes a circular in cross-section upper tubular portion 90, along with a swaged, restricted lower portion 92 presenting a square in cross-section lower bore 94. In the use of the anchor member 84, the wrench tube 46 is passed downwardly through upper portion 90 and into engagement with the inner walls defining the lower bore 94.

FIGS. 15–16 show another anchor member 96 having a blade 98 and hub 100. Here again, the hub includes a circular in cross-section upper portion 102, and a swaged lower portion 104 presenting an octagonal in cross-section lower bore 106. Referring to FIG. 15, insertion of a standard square in cross-section wrench tube 46 into lower bore 106 is illustrated. As can be seen, a mating fit between the walls of the wrench shank, and the walls defining lower bore 106, establishes a driving connection.

Finally, FIGS. 17–18 depict an anchor member 108 having a helical blade 110 and a central hub 112. In this instance the hub is formed from a unitary blade 114 of material which is bent in a spiral-like form to define a generally square in cross-section, open-ended bore 116 therethrough.

FIGS. 19–21 illustrate another type of anchor in accordance with the invention. Specifically, this anchor 118 includes an elongated, threaded rod 120 provided with an adjustable nut 122 adjacent the lower end thereof. An anchor member 124 is also provided which includes an open-ended, square tubular section 126 having a helical blade 128 welded to the exterior thereof. The section defines an elongated bore 130 along the length thereof, and is provided with annular, inwardly extending, nut-engaging element 132 which is rigidly affixed to tubular section 126, and which engages nut 122 for supporting the anchor member 124 on rod 120. The hub 126 further includes a pair of laterally spaced, side-by-side, depending pointed projections 134 which extend below the element 132 and in effect define an earth-penetrating lead for the anchor member 118.

In FIG. 21 a double helix form is depicted which includes, in addition to rod 120 and anchor member 124, a second anchor member 136. The member 136 includes a square tubular hub 138 of length greater than that of section 126 with a helix 140 welded to the exterior thereof.

In the use of the FIGS. 19–21 embodiment a standard wrench tube is passed through the section 126 until element 132 is reached. This drivingly couples the wrench tube and the section 126 (in the case of FIG. 21, the anchor member 136 would be similarly coupled). The projections 134 define the earth-penetrating lead for the anchor.

Actual field testing of anchors in accordance with the invention has confirmed that anchors are very resistant to load-induced breakage. As pointed out above, this increase in strength is obtained without use of additional material as compared with conventional anchors, and further the anchors hereof can be installed using existing wrenches and the like. Moreover, the modular nature of the present anchors reduces storage requirements and allows purchase of fewer components to meet various anchoring needs.

The modular construction of the anchors of the invention also allows substantial strengthening of the rod-lead connection. In prior anchors the outer diameter of the anchor shaft was limited because of the need to fit within a wrench tube, and accordingly the outer diameter of the tension rod connected thereto was correspondingly limited. In the present invention however, sizing constraints on these components are much less, so that a larger and stronger tension rod can be employed (particularly at the region of the lead connection), and this increases the holding capability of the overall anchor. Further, the relative lack of size constraints on the anchor members hereof makes it possible to use synthetic resin materials in the fabrication thereof as opposed to metal.

Having thus described the invention, what is claimed as new and desired to be secured by Letters Patent is:

1. In combination:

an elongated rod *having earth penetrating lead means adjacent one end thereof;* an anchor member *initially separate from said rod and* including a hub presenting a bore[therein] *extending completely through said hub*, and an outwardly extending, load-bearing element affixed to the exterior of said hub,

*said hub being slidably received on said rod such that* said rod [extending into] *extends completely through* said hub bore;

means for operably coupling said anchor member to said rod;

a wrench including an elongated, tubular shank telescoped over said rod and extending into said hub bore such that the portion of said shank [extended] *which extends* into the hub bore is disposed between said rod and *said* hub;

[structure for drivingly connecting said shank to both of said rod and said anchor member such that axial rotation of said shank effects corresponding rotation of said rod and anchor member and distribution of driving forces from said shank to said rod and anchor member, whereby] *said wrench shank having outer wall surfaces for cooperative, driving engagement with an internal portion of said hub defining at least a part of said bore,*

*said wrench shank having inner wall surfaces,*

*said rod having structure for complemental, mating fit with said inner wall surfaces of said wrench shank such that said wrench, in disposition over said rod and within the hub bore of said anchor member, is operable to prohibit free lateral play of said rod relative to said anchor member and establish a connection of sufficient strength to enable driving rotation of said anchor member as well as independent, driving rotation of said rod lead means under forces such that* installation of the rod and anchor member into the earth is facilitated without *collapse of said wrench shank or* breakage [thereof; and means defining an earth-penetrating lead adjacent one end of said rod] *of said rod or anchor member.*

2. The combination as set forth in claim 1, said hub being defined by an elongated, tubular member.

3. The combination as set forth in claim 1 said hub being defined by a pair of elongated, opposed, metallic angles cooperatively defining said bore therebetween.

4. The combination as set forth in claim 1, said hub having one end thereof of lesser diameter than the remainder of the hub.

5. The combination as set forth in claim 1, said load-bearing element comprising a helical blade.

6. The combination as set forth in claim 1 wherein said coupling means comprises engagement structure on one of said hub or rod for supporting said anchor member.

7. The combination as set forth in claim 6 wherein said engagement structure comprises outwardly extending shoulder means on said rod.

[8. The combination as set forth in claim 1 wherein said connecting structure comprises cooperative mating fit wall surfaces on said wrench shank, rod, and hub respectively.]

9. The combination as set forth in claim 1, wherein said internal portion of said hub defining said bore includes walls at least in part defining said hub bore and presenting a section thereof of polygonal cross-section, said wrench shank being of non-circular cross-section for operatively engaging said walls.

10. The combination as set forth in claim 1 wherein said [lead-defining] *lead* means comprises an elongated terminal section.

11. The combination as set forth in claim 10, said terminal section being oriented at an angle relative to the major portion of said rod.

12. The combination as set forth in claim 10 wherein said terminal section is threadably coupled to said major portion of said rod.

13. The combination as set forth in claim 10, said terminal rod section being provided with an elongated, threaded bore therethrough, said rod being threaded for reception in said bore for adjustment of the overall length of the entire rod, including said terminal section.

[14. The combination as set forth in claim 1 wherein said lead-defining means comprises at least one earth penetrating portion connected to said hub.]

[15. The combination as set forth in claim 1, said anchor member being free of permanent connection to said rod, whereby said combination is modular in nature.]

16. In a method of driving an anchor into the earth wherein the anchor includes an elongated rod *having lead means* and an outwardly extending load-bearing element operably coupled to the rod, and wherein the method includes the steps of telescoping an elongated, tubular wrench shank over said rod, drivingly connecting said wrench shank and rod, and axially rotating said shank to effect corresponding rotation of the rod and element to install said anchor into the earth, the improved method which comprises:

providing an anchor member having an open-ended hub presenting a bore therethrough, with said element affixed to the exterior of the hub;

passing said rod *completely* through said hub and operably coupling said anchor member to the rod;

telescoping said wrench shank over said rod, *and* inserting the end of said shank into said hub bore such that said shank end is disposed between said rod and hub[, and drivingly engaging said connecting said shank, rod and anchor member] *and to prohibit free lateral play of said rod relative to said anchor member and for establishment of a connection of sufficient strength to enable driving rotation of said anchor member as well as independent, driving rotation of said rod lead means*; and axially rotating said wrench shank to effect distribution of rotative driving forces from the shank *directly and independently* to said rod and *also directly and independently to said* anchor member, and [corresponding rotation of] *to correspondingly rotate* said rod and anchor member *such that installation of said rod and anchor member into the earth is facilitated without collapse of said wrench shank or breakage of said rod or anchor member.*

17. An earth anchor, comprising:

an elongated rod having an earth-penetrating lead *means* adjacent one end thereof, and outwardly extending, polygonal shoulder-defining structure proximal to said lead;

an anchor member including an open-ended hub having interior walls defining a bore therethrough extending between said open ends, and an outwardly extending load-bearing member secured to said hub,

*said hub being slidably received on said rod* [passing] *extends completely* through said hub bore, with portions of said bore-defining walls surrounding said shoulder-defining structure being in spaced relationship from said structure and cooperatively defining a polygonal structure-receiving opening; and means operably coupling said anchor member to said rod, the cross-sectional dimensions of said bore, and the spacing between said shoulder-defining structure and said wall portions, being sufficient for passage of a complemental wrench tube between said interior walls and said rod, and between said wall portions and said shoulder-defining structure[, for establishing a driving engagement and connection between said tube, shoulder-defining structure and opening-defining wall portions, whereby axial rotation of the tube distributes rotative driving forces from the tube to the rod and anchor member and effects corresponding rotation in unison to said rod and anchor member, in order to facilitate installation of the anchor into the earth without anchor breakage] *to prohibit lateral free play of said rod relative to said anchor member and to establish a connection of sufficient strength to enable driving rotation of said anchor member as well as driving rotation of said rod lead means under forces such that installation of the rod and anchor member into the earth is facilitated without collapse of said wrench shank or breakage of said rod or anchor member.*

18. The earth anchor as set forth in claim 17, said hub bore being polygonal and of substantially constant cross-sectional dimensions throughout the length thereof between said open ends.

19. An anchor rod, comprising:

an elongated rod presenting an upper end and an opposed lower end;

a radially outwardly extending flange adjacent the lower end of said rod, *said flange being engageable with an anchor member having an outwardly extending load bearing member:* an elongated earth-penetrating lead below said flange, the longitudinal axis of said lead being disposed at an angle relative to the longitudinal axis of said rod; and radially outwardly extending, polygonal shoulder-defining structure above said flange and proximal thereto, said flange extending radially outwardly from said rod farther than said shoulder-defining structure, said lead serving to cut through the earth during rotative installation of the rod to facilitate installation thereof, particularly in densse or rocky soils,

*said shoulder-defining structure being engageable with internal walls of a tubular wrench shank for a cooperative, mating fit connection such that as said shank is rotated, the rotative forces are evenly distributed to said rod without breakage thereof.*

*20. The combination as set forth in claim 1, said rod being of integral construction.*

*21. The combination as set forth in claim 1, said rod being formed of separable components threadably coupled together.*

* * * * *